United States Patent
Hsu (10) Patent No.: US 8,769,771 B2
(45) Date of Patent: Jul. 8, 2014

(54) ROTARY SHAFT WIRE PASSAGE STRUCTURE

(75) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 13/552,811

(22) Filed: Jul. 19, 2012

(65) Prior Publication Data

US 2014/0020207 A1    Jan. 23, 2014

(51) Int. Cl.
    *E05D 11/08*     (2006.01)
    *E05D 5/10*     (2006.01)

(52) U.S. Cl.
    USPC ................ 16/342; 16/386; 16/387

(58) Field of Classification Search
    USPC ............ 16/386, 342, 337, 338; 361/679.06,
    361/679.08, 679.11, 679.12, 679.15,
    361/679.27, 679.28; 455/575.1, 575.3,
    455/575.4, 575.8, 550.1, 90.3; 348/373,
    348/333.06, 794; 379/433.12, 433.13
    See application file for complete search history.

(56) References Cited

U.S. PATENT DOCUMENTS

| | | | |
|---|---|---|---|
| 5,951,312 A * | 9/1999 | Horng | 439/165 |
| 6,671,929 B1 * | 1/2004 | Lu | 16/342 |
| 7,267,566 B2 * | 9/2007 | Ku et al. | 439/165 |
| 8,060,985 B2 * | 11/2011 | Lin | 16/374 |
| 2007/0000088 A1 * | 1/2007 | Mao et al. | 16/54 |
| 2008/0229544 A1 * | 9/2008 | Hsu et al. | 16/223 |
| 2010/0170064 A1 * | 7/2010 | Huang et al. | 16/387 |
| 2013/0038191 A1 * | 2/2013 | Wang et al. | 312/326 |

FOREIGN PATENT DOCUMENTS

JP      2003120112 A * 4/2003

* cited by examiner

*Primary Examiner* — Chuck Mah
(74) *Attorney, Agent, or Firm* — Rosenberg, Klein & Lee (57) ABSTRACT

A rotary shaft wire passage structure includes a pivot pin and a pivot seat respectively fixedly connected with a pivotal rotary member and a relative pivotal rotary member. The pivot pin has a pivoted section and an annular raised section disposed at one end thereof. The pivoted section is formed with an axial through hole in full communication with outer side via a split. The pivot seat has a shaft hole in which the pivoted section is fitted. One side of the shaft hole is formed with a fissure in communication with the outer side. The fissure is adjustable to a position where the fissure is aligned with the split for placing a wire into the through hole. When the relative pivotal rotary member is pivotally rotated to a working position by a certain angle, the fissure is misaligned from the split to prevent the wire from slipping out.

18 Claims, 7 Drawing Sheets

ROTARY SHAFT WIRE PASSAGE STRUCTURE

BACKGROUND OF THE INVENTION

1. Field of the Invention

The present invention relates generally to an improved rotary shaft wire passage structure, and more particularly to a rotary shaft structure, which is easy to assemble and able to provide full protection for the wire without affecting operation of the product.

2. Description of the Related Art

A conventional rotary shaft wire passage structure generally includes a rotary shaft pivotally connected between a pivotal rotary member (such as a screen) and a relative pivotal rotary member (such as a main body). The rotary shaft is formed with a central through hole having two openings at two ends of the rotary shaft respectively. A wire can be conducted from the relative pivotal rotary member (the main body) through the rotary shaft into the pivotal rotary member (the screen). There is a trend to miniaturize and sophisticate the electronic product. Therefore, the relative pivotal rotary member (the main body) and the pivotal rotary member (the screen) often fail to provide sufficient assembling space on two sides of the rotary shaft. Also, under the limitation of the diameter and size of the rotary shaft, the through hole has a quite small diameter. This makes it difficult to conduct the wire through the through hole.

Therefore, the currently most often seen rotary shaft wiring method is to directly transfer the hollow rotary shaft to a wiring workshop where the necessary wire is previously conducted through the hollow rotary shaft and two end sections of the wire are respectively connected (soldered) onto two connectors (or terminals) to form a semi-product of wired rotary shaft. Then, the semi-product is transferred to a production factory of the electronic product where the two connectors (terminals) are directly connected with the corresponding connectors (terminal blocks) of the relative pivotal rotary member (the main body) and the pivotal rotary member (the screen) to complete the rotary shaft wiring procedure. In practice, the above structure and processing procedure have the following shortcomings:

1. It is necessary to first transfer the rotary shaft to the wiring workshop to wire the rotary shaft. This leads to increase of processing time and cost. Moreover, the semi-product of the rotary shaft is likely to damage during the transfer. As a result, the ratio of defective products is increased.
2. The processing procedure of the semi-product of the rotary shaft leads to increase of the number of the manufacturing steps. Furthermore, the rotary shaft is relatively inconvenient to assemble. As a result, the production efficiency is lower and the cost is increased.

SUMMARY OF THE INVENTION

It is therefore a primary object of the present invention to provide an improved rotary shaft wire passage structure, which is simplified and convenient to assemble. Accordingly, the ratio of good products is increased and the manufacturing cost is lowered.

It is a further object of the present invention to provide the above rotary shaft wire passage structure the processing procedure of which is simplified. It is unnecessary to first transfer the hollow rotary shaft to the wiring workshop for processing. Therefore, the transfer time is saved and the production efficiency is increased.

It is still a further object of the present invention to provide the above rotary shaft wire passage structure in which the wire is fully protected to effectively prolong the lifetime of the product.

To achieve the above and other objects, the rotary shaft wire passage structure of the present invention includes: a pivot pin having a pivoted section and an annular raised section connected with the pivoted section, the pivoted section being formed with an axial through hole extending to the annular raised section, the through hole being fully in communication with outer side via a split; and a pivot seat having a shaft hole in which the pivoted section is fitted. One side of the shaft hole is formed with a fissure in communication with the outer side. The fissure is adjustable to be aligned with the split so as to open the split to the outer side. The fissure also is adjustable to be misaligned from the split so as to close the split from the outer side.

In the above rotary shaft wire passage structure, the annular raised section is formed with a transversely extending cut in communication with the split.

In the above rotary shaft wire passage structure, the pivot seat is connected with a relative pivotal rotary member.

In the above rotary shaft wire passage structure, the pivot pin further has a connection section extending from one end of the annular raised section, which end is distal from the pivoted section.

In the above rotary shaft wire passage structure, the connection section is fixedly fitted in a fitting hole of a fixing member.

In the above rotary shaft wire passage structure, the fixing member is connected with a pivotal rotary member.

In the above rotary shaft wire passage structure, one side of the pivot seat, which side is adjacent to the annular raised section, is formed with an abutment section, one side of the annular raised section, which side is adjacent to the pivoted section, is formed with a stop section for stopping the abutment section from pivotally rotating.

In the above rotary shaft wire passage structure, the pivot seat has a fixing section.

In the above rotary shaft wire passage structure, the fixing member has a fixing section.

The present invention can be best understood through the following description and accompanying drawings, wherein:

DETAILED DESCRIPTION OF THE PREFERRED EMBODIMENTS

Figure 1:
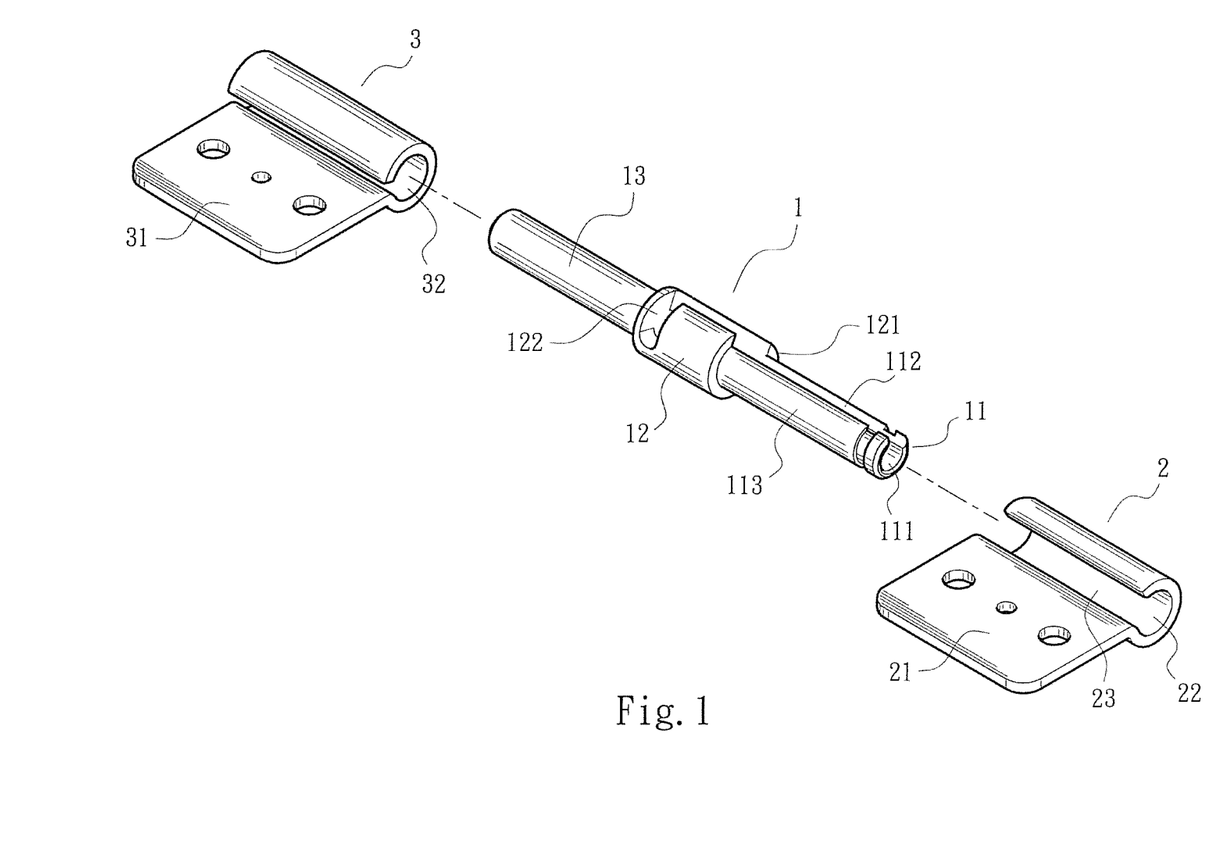
FIG. 1 is a perspective exploded view of the present invention.
Figure 2:
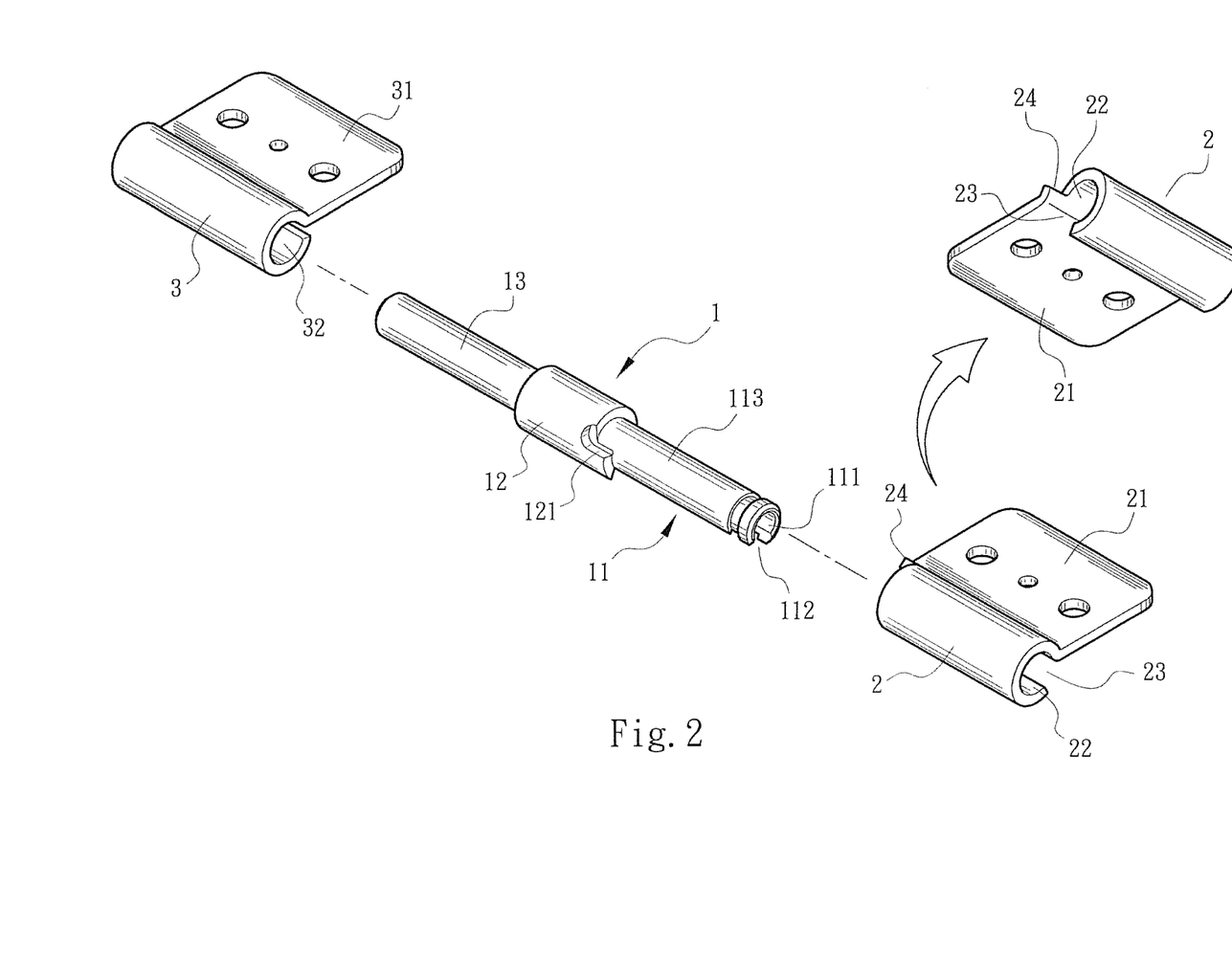
FIG. 2 is a perspective exploded view of the present invention, seen in another direction.

Please refer to FIGS. 1 and 2. The rotary shaft wire passage structure of the present invention includes a pivot pin 1 and a pivot seat 2. The pivot pin 1 has a pivoted section 11 and an annular raised section 12 disposed at one end of the pivoted section 11. A center of the pivoted section 11 is formed with an axial through hole 111 extending to the annular raised section 12. The through hole 111 is fully in communication with outer side via a split 112. The annular raised section 12 is formed with a transversely extending cut 122 in communication with the split 112. An outer circumference of the pivoted section 11 except the split 112 forms a pivoted surface 113. One side of the annular raised section 12, which side is adjacent to the pivoted section 11, is formed with a protruding stop section 121. The pivot seat 2 has a fixing section 21 and a shaft hole 22 in which the pivoted section 11 can be tightly fitted. One side of the shaft hole 22 is formed with a fissure 23 in communication with the outer side. One side of the pivot seat 2, which side is adjacent to the annular raised section 12, is formed with an abutment section 24 for abutting against the stop section 121 in pivotal rotation.

In practice, the pivot pin 1 further has a connection section 13 extending from the other side of the annular raised section 12 opposite to the pivoted section 11. The connection section 13 can be fitted in a fitting hole 32 of a fixing member 3. The fixing member 3 and the connection section 13 can be fixedly connected with each other by means of welding or riveting. (Alternatively, the fixing member 3 can be directly integrally formed on the connection section 13). The fixing member 3 has a fixing section 31 fixedly connectable with a pivotal rotary member 5.

Figure 3:
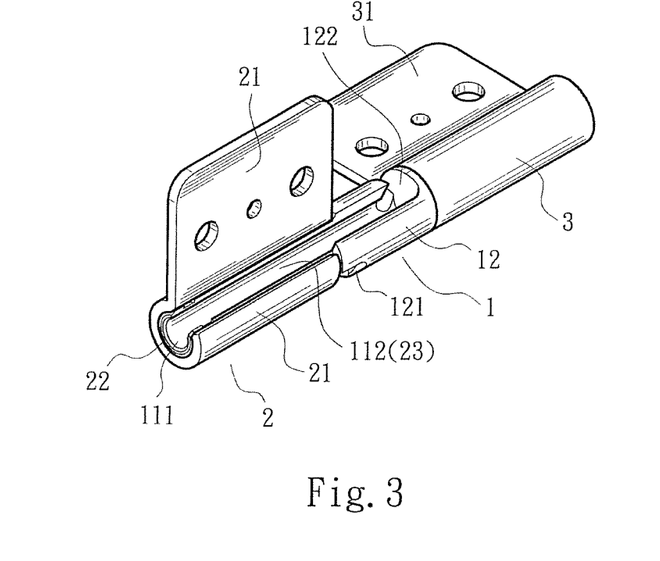
FIG. 3 is a perspective assembled view of the present invention, showing that the split and the fissure are aligned with each other.
Figure 4:
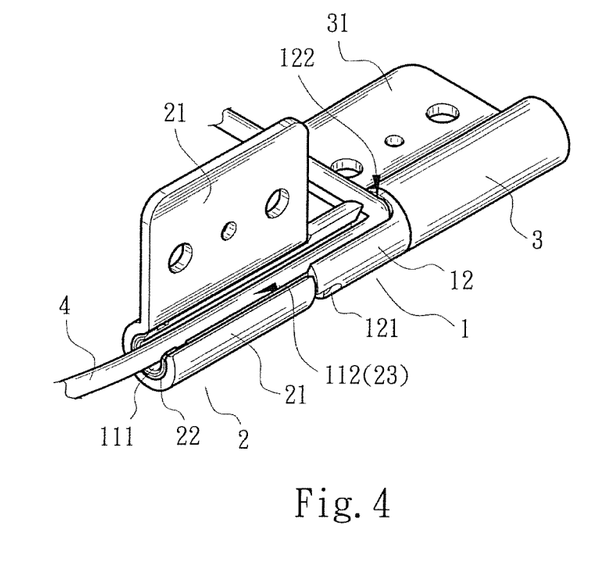
FIG. 4 is a perspective assembled view of the present invention, showing that a wire is placed into the through hole of the pivot pin.
Figure 5:
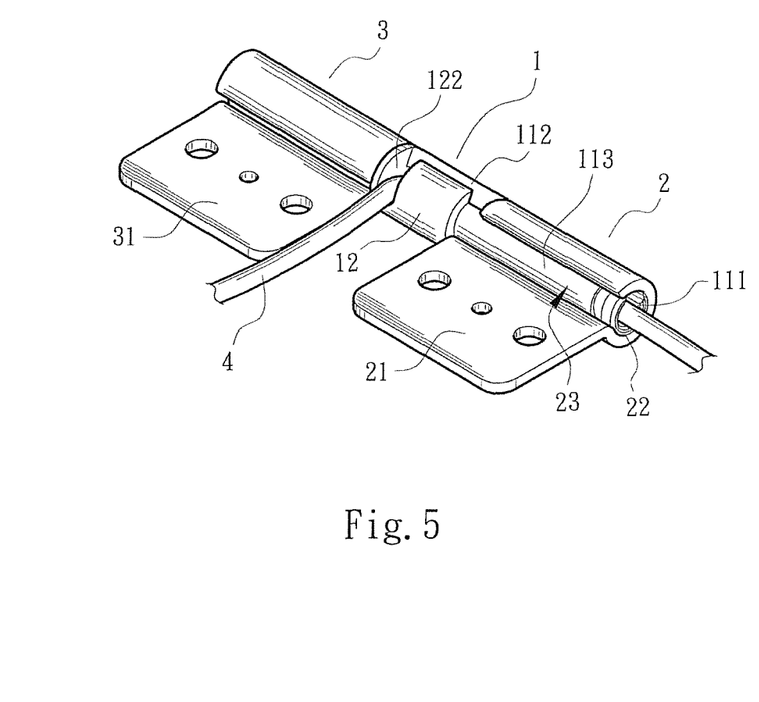
FIG. 5 is a perspective assembled view of the present invention, showing that after the wire is placed into the through hole, the relative pivotal rotary member connected with the pivot seat is closed onto the pivotal rotary member connected with the pivot pin.
Figure 6:
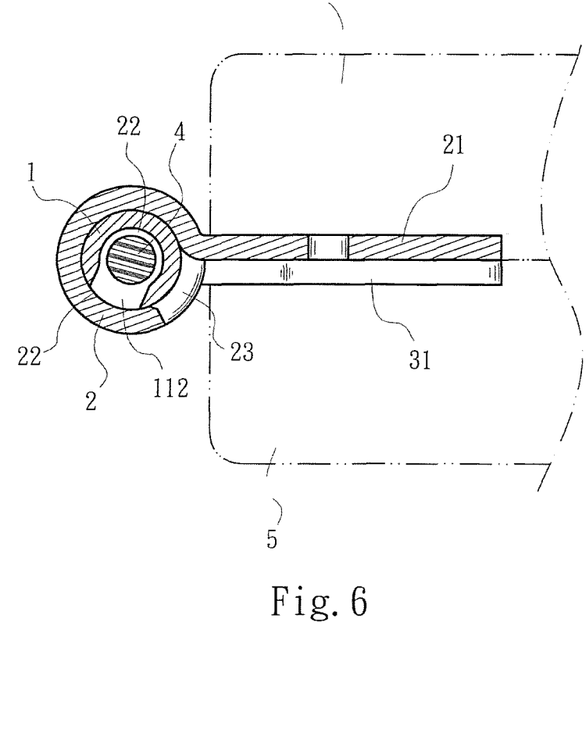
FIG. 6 is a sectional view according to FIG. 5, showing the position relationship between the pivot pin and the pivot seat.

Please refer to FIGS. 3 to 9. When assembled, the relative positions of the pivot pin 1 and the pivot seat 2 are first adjusted to align the fissure 23 with the split 112 (as shown in FIG. 3). Under such circumstance, a wire 4 can be placed into the through hole 111 through the fissure 23 and the split 112. One end of the wire 4 extends out of an opening of the through hole 111 at one end of the pivoted section 11, which end is distal from the annular raised section 12. The other end of the wire 4 is bent to extend out of the transversely extending cut 122 (as shown in FIG. 4). The transversely extending cut 122 also serves to substantially provide a locating and stopping effect for the wire 4 so as to prevent the wire 4 from easily slipping out. Then, the pivot seat 2 is pivotally rotated relative to the pivot pin 1 to a working position. At this time, the fissure 23 is misaligned from the split 112 so as to prevent the wire 4 from slipping out. Then the pivot pin 1 (the connection section 13 or the fixing section 31 of the fixing member 3) and the pivot seat 2 (the fixing section 21) are respectively fixedly connected with the pivotal rotary member 5 (such as the main body of a notebook) and a relative pivotal rotary member 6 (such as a screen of the notebook) (as shown in FIGS. 5 and 6).

Figure 7:
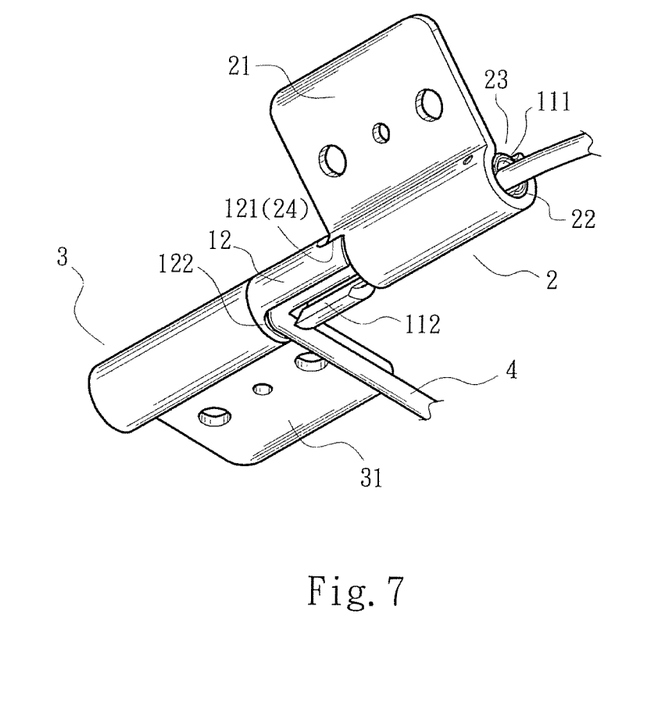
FIG. 7 is a perspective assembled view of the present invention, showing that after the wire is placed into the through hole, the relative pivotal rotary member connected with the pivot seat is opened from the pivotal rotary member connected with the pivot pin.
Figure 8:
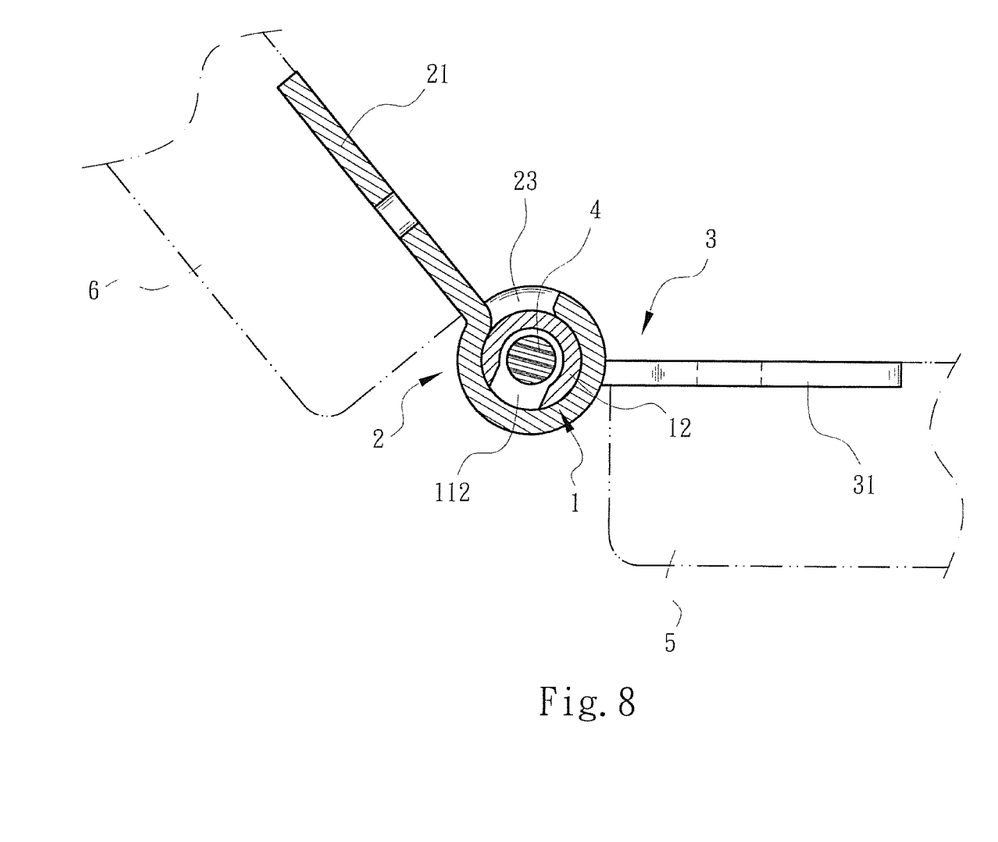
FIG. 8 is a sectional view according to FIG. 7, showing the position relationship between the pivot pin and the pivot seat.
Figure 9:
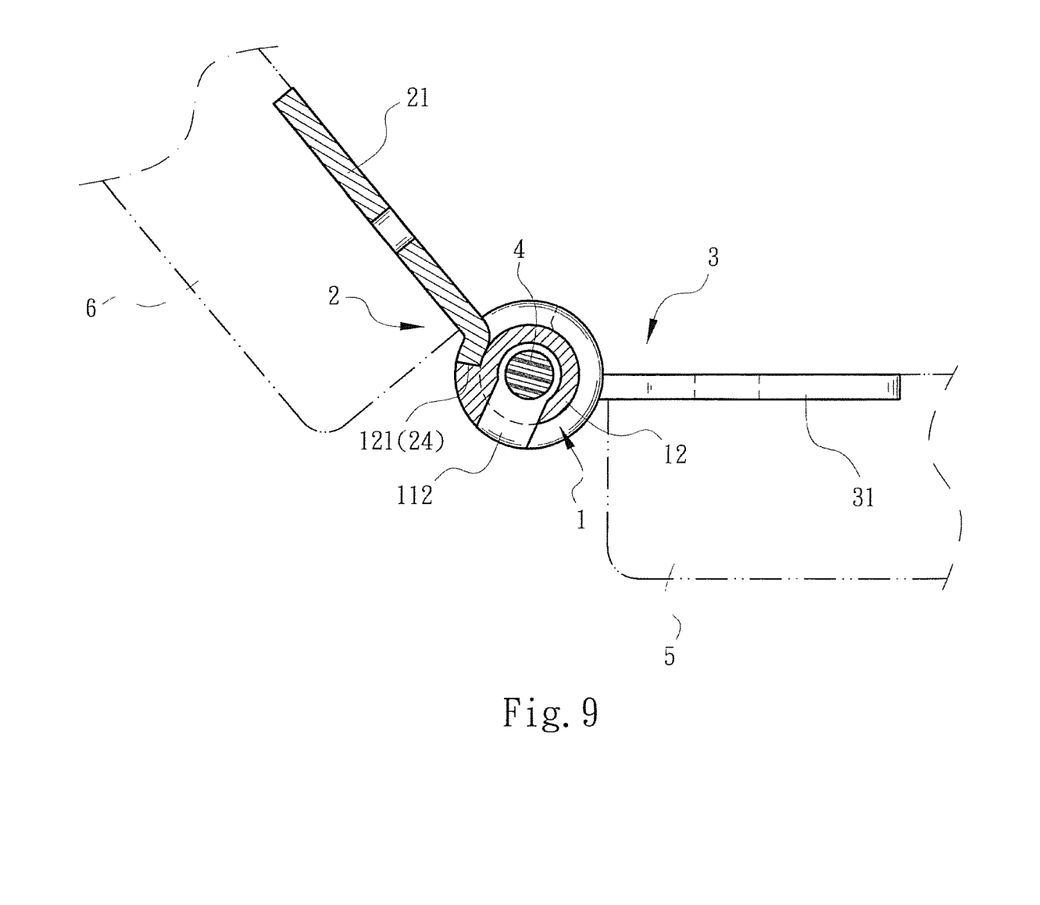
FIG. 9 is a sectional view according to FIG. 7, showing the position relationship between the stop section of the pivot pin and the abutment section of the pivot seat.

In use, the relative pivotal rotary member 6 can be positioned in a closed position where the relative pivotal rotary member 6 covers the pivotal rotary member 5 (with the angle contained therebetween zero degree) (as shown in FIGS. 5 and 6) or the relative pivotal rotary member 6 (the pivot seat 2) can be pivotally rotated and opened from the pivotal rotary member 5 (the pivot pin 1) until the abutment section 24 is stopped by the stop section 121 (as shown in FIG. 9). Accordingly, the relative pivotal rotary member 6 (the pivot seat 2) can be kept in a fully opened position where the relative pivotal rotary member 6 is opened from the pivotal rotary member 5 (the pivot pin 1) (with the angle contained therebetween about 120 degrees) (as shown in FIGS. 7 and 8). No matter whether the relative pivotal rotary member 6 is closed or opened, the fissure 23 is always misaligned from the split 112 so as to prevent the wire 4 from slipping out. Therefore, in practice, before the pivot pin 1 and the pivot seat 2 are assembled with the pivotal rotary member 5 and the relative pivotal rotary member 6, the split 112 and the fissure 23 can be adjusted and aligned with each other for placing in the wire 4. Accordingly, the processing is facilitated. After the pivot pin 1 and the pivot seat 2 are assembled with the pivotal rotary member 5 and the relative pivotal rotary member 6, within the pivotal rotation range between the closed and opened positions, the split 112 is always misaligned from the fissure 23 so as to well protect and locate the wire 4 and prevent the wire 4 from slipping out.

In conclusion, the rotary shaft wire passage structure of the present invention is simplified and convenient to assemble. Accordingly, the ratio of good products is increased and the manufacturing cost is lowered.

The above embodiments are only used to illustrate the present invention, not intended to limit the scope thereof. Many modifications of the above embodiments can be made without departing from the spirit of the present invention.

What is claimed is:

1. A rotary shaft wire passage structure comprising:
   a pivot pin having a pivoted section and an annular raised section connected with the pivoted section, the pivoted section being formed with an axial through hole extending to the annular raised section, the through hole being fully in communication with outer side via a split; and
   a pivot seat having a shaft hole in which the pivoted section is fitted, one side of the shaft hole being formed with a fissure in communication with the outer side, the fissure being adjustable to be aligned with the split so as to open the split to the outer side, the fissure also being adjustable to be misaligned from the split so as to close the split from the outer side
   wherein the annular raised section is formed with a transversely extending cut in communication with the split.

2. The rotary shaft wire passage structure as claimed in claim 1, wherein the pivot pin further has a connection section extending from one end of the annular raised section, which end is distal from the pivoted section.

3. The rotary shaft wire passage structure as claimed in claim 2, wherein one side of the pivot seat, which side is adjacent to the annular raised section, is formed with an abutment section, one side of the annular raised section, which side is adjacent to the pivoted section, is formed with a stop section for stopping the abutment section from pivotally rotating.

4. The rotary shaft wire passage structure as claimed in claim 2, wherein the pivot seat has a fixing section.

5. The rotary shaft wire passage structure as claimed in claim 2, wherein the connection section is fixedly fitted in a fitting hole of a fixing member.

6. The rotary shaft wire passage structure as claimed in claim 5, wherein one side of the pivot seat, which side is adjacent to the annular raised section, is formed with an abutment section, one side of the annular raised section, which side is adjacent to the pivoted section, is formed with a stop section for stopping the abutment section from pivotally rotating.

7. The rotary shaft wire passage structure as claimed in claim 5, wherein the pivot seat has a fixing section.

8. The rotary shaft wire passage structure as claimed in claim 5, wherein the fixing member is connected with a pivotal rotary member.

9. The rotary shaft wire passage structure as claimed in claim 8, wherein one side of the pivot seat, which side is adjacent to the annular raised section, is formed with an abutment section, one side of the annular raised section, which side is adjacent to the pivoted section, is formed with a stop section for stopping the abutment section from pivotally rotating.

10. The rotary shaft wire passage structure as claimed in claim 8, wherein the pivot seat has a fixing section.

11. The rotary shaft wire passage structure as claimed in claim 9, wherein the fixing member has a fixing section.

12. The rotary shaft wire passage structure as claimed in claim 1, wherein the pivot seat is connected with a relative pivotal rotary member.

13. The rotary shaft wire passage structure as claimed in claim 12, wherein the pivot seat has a fixing section.

14. The rotary shaft wire passage structure as claimed in claim 12, wherein one side of the pivot seat, which side is adjacent to the annular raised section, is formed with an abutment section, one side of the annular raised section, which side is adjacent to the pivoted section, is formed with a stop section for stopping the abutment section from pivotally rotating.

15. The rotary shaft wire passage structure as claimed in claim 14, wherein the fixing member has a fixing section.

16. The rotary shaft wire passage structure as claimed in claim 1, wherein one side of the pivot seat, which side is adjacent to the annular raised section, is formed with an abutment section, one side of the annular raised section, which side is adjacent to the pivoted section, is formed with a stop section for stopping the abutment section from pivotally rotating.

17. The rotary shaft wire passage structure as claimed in claim 16, wherein the fixing member has a fixing section.

18. The rotary shaft wire passage structure as claimed in claim 1, wherein the pivot seat has a fixing section.

* * * * *